United States Patent
Rastogi et al.

(10) Patent No.: US 10,036,490 B2
(45) Date of Patent: Jul. 31, 2018

(54) HOLLOW ARTICLE MADE OF UHMWPE TAPES

(71) Applicant: TEIJIN ARAMID B.V., Arnhem (NL)

(72) Inventors: Sanjay Rastogi, Eindhoven (NL); Marinus Journee, Loo (NL)

(73) Assignee: TEIJIN ARAMID B.V., Arnhem (NL)

( * ) Notice: Subject to any disclaimer, the term of this patent is extended or adjusted under 35 U.S.C. 154(b) by 47 days.

(21) Appl. No.: 14/912,283

(22) PCT Filed: Aug. 5, 2014

(86) PCT No.: PCT/EP2014/066798
§ 371 (c)(1),
(2) Date: Feb. 16, 2016

(87) PCT Pub. No.: WO2015/022234
PCT Pub. Date: Feb. 19, 2015

(65) Prior Publication Data
US 2016/0208960 A1 Jul. 21, 2016

(30) Foreign Application Priority Data

Aug. 14, 2013 (EP) .................................... 13180334

(51) Int. Cl.
*F16L 9/16* (2006.01)
*B29C 53/60* (2006.01)
(Continued)

(52) U.S. Cl.
CPC ............... *F16L 9/16* (2013.01); *B29C 53/60* (2013.01); *B29K 2023/0683* (2013.01);
(Continued)

(58) Field of Classification Search
CPC ......................... F16L 9/16; B29K 2023/0683
(Continued)

(56) References Cited

U.S. PATENT DOCUMENTS

2011/0095447 A1* 4/2011 Peters .................. B29C 43/003
264/119
2011/0300328 A1* 12/2011 Van Putten ............. B29C 43/14
428/98

FOREIGN PATENT DOCUMENTS

EP         0223252 A2     5/1987
EP         0803347 A1    10/1997
(Continued)

OTHER PUBLICATIONS

Talebi et al., "Molar Mass and Molecular Weight Distribution Determination of UHMWPE Synthesized Using a Living Homogeneous Catalyst," Macromolecules, 2010, vol. 43, pp. 2780-2788.
(Continued)

*Primary Examiner* — Craig Schneider
*Assistant Examiner* — David Deal
(74) *Attorney, Agent, or Firm* — Oliff PLC

(57) ABSTRACT

The disclosure pertains to pipe-like hollow articles made of ultra-high molecular weight polyethylene (UHMWPE) tapes and a thermoplastic and/or thermoplastic elastomer, whereby in the article, the tapes are wound to create the article, whereby the tapes have a tensile strength of greater than 1.5 GPa according to ASTM D882-00, a modulus of greater than 100 GPa according to ASTM D882-00, and a 200/110 uniplanar orientation parameter of at least 3, whereby the main extension direction of at least one tape in the article is in an angle of 20 to 100° with regard to the main extension direction of the article. Further aspects pertain to two processes for manufacturing such an article.

17 Claims, 5 Drawing Sheets

(51) Int. Cl.
   *B29K 23/00*       (2006.01)
   *F16L 9/12*        (2006.01)
   *B29K 105/00*      (2006.01)
   *B29L 23/00*       (2006.01)

(52) U.S. Cl.
   CPC .......................... *B29K 2105/256* (2013.01);
      *B29K 2995/0077* (2013.01); *B29K 2995/0088*
         (2013.01); *B29L 2023/22* (2013.01); *F16L
                                    9/12* (2013.01)

(58) Field of Classification Search
   USPC ................ 138/130, 129, 137, 140, 153, 154
   See application file for complete search history.

(56)              References Cited

FOREIGN PATENT DOCUMENTS

| EP | 1868808 B1 | 3/2010 | | |
|----|------------|--------|---|---|
| EP | 2307180 B1 | 11/2011 | | |
| JP | 2011528099 A | 11/2011 | | |
| WO | 9703815 A1 | 2/1997 | | |
| WO | 2008/040506 A1 | 4/2008 | | |
| WO | 2010007062 A1 | 1/2010 | | |
| WO | 2012/097083 A2 | 7/2012 | | |
| WO | WO 2012172289 A1 * | 12/2012 | ............ | F16L 11/086 |

OTHER PUBLICATIONS

Nov. 5, 2014 International Search Report issued in International Patent Application No. PCT/EP2014/066798.
Feb. 28, 2017 Office Action Issued in Japanese Patent Office Application No. 2016-533886.

* cited by examiner

HOLLOW ARTICLE MADE OF UHMWPE TAPES

BACKGROUND

The disclosure pertains to a pipe-like hollow article made of ultra-high molecular weight polyethylene (UHMWPE) tapes and a thermoplastic and/or thermoplastic elastomer, whereby the tapes are wound to create said article.

Hollow articles made of UHMWPE are known in the art.

In EP 0 223 252, a method for preparing a molded article of UHMWPE is disclosed. A thin-wall UHMWPE porous sheet is molded into a thin-wall article, whereby the porous sheet is prepared by feeding UHMWPE powder to between at least two heated rolls and melting it into a sheet at molding temperature more than 140° C. For producing the molded article a temperature in the range of more than 150° C. is used for melting the UHMWPE. The applied tapes have a low tensile strength and low modulus and thus also the article has a low dimensional stability.

In WO 2012/097083, a method for manufacturing ballistic helmets is disclosed. For the helmet Tensylon or Dyneema is used, whereby this ballistic-tolerant tape has been coated with a thermoplastic or thermosetting adhesive and is wound around a solid mandrel. The winding results in a spheroid structure, which can be cut into two equally-spaced preforms. Although the winding angles and sequences of the winding machine used in this process may be changed, the hollow article of this document is always spheroid.

In EP 0 803 347, an improved coating for e.g., fabrics for tanks is disclosed. This coating has an improved resistance to permeation of aromatics and mineral acids and resistance to bend cracking. To achieve this, ultra-high molecular weight polyethylene tapes are used, whereby all tapes are helically wounded on a core to create the article. This document does not disclose the use of tapes with a tensile strength of greater than 1.5 GPa according to ASTM D882-00 and an modulus of greater than 100 GPa according to ASTM D882-00 and a 200/110 uniplanar orientation parameter of at least 3. In addition, EP 0 803 347 does not disclose that the main extension direction of at least half of the tapes in the article is in an angle of 20 to 100° with regard to the main extension direction of the article, whereby also the 200/120 uniplanar orientation parameter of these tapes is parallel to the main extension direction of these tapes. Burst pressure and advantages of wound technics for the tapes are not discussed in this document.

EP 2 307 180 discloses ultra-high molecular weight polyethylene tapes, whereby the tapes have a tensile strength of greater than 1.5 GPa according to ASTM D882-00 and an modulus of greater than 100 GPa according to ASTM D882-00 and a 200/110 uniplanar orientation parameter of at least 3. This document does not disclose the use of such tapes for pipe-like articles and no arrangement of tapes in articles is discussed. In addition, EP 2 307 180 gives no hints in respect of an arrangement of such tapes in an article for increasing the burst pressure for such an article.

BRIEF SUMMARY

The aim of this disclosure is to create a pipe-like hollow article, which has a high dimensional stability, especially a high resistibility in respect to burst pressure.

DETAILED DESCRIPTION

Figure 1:
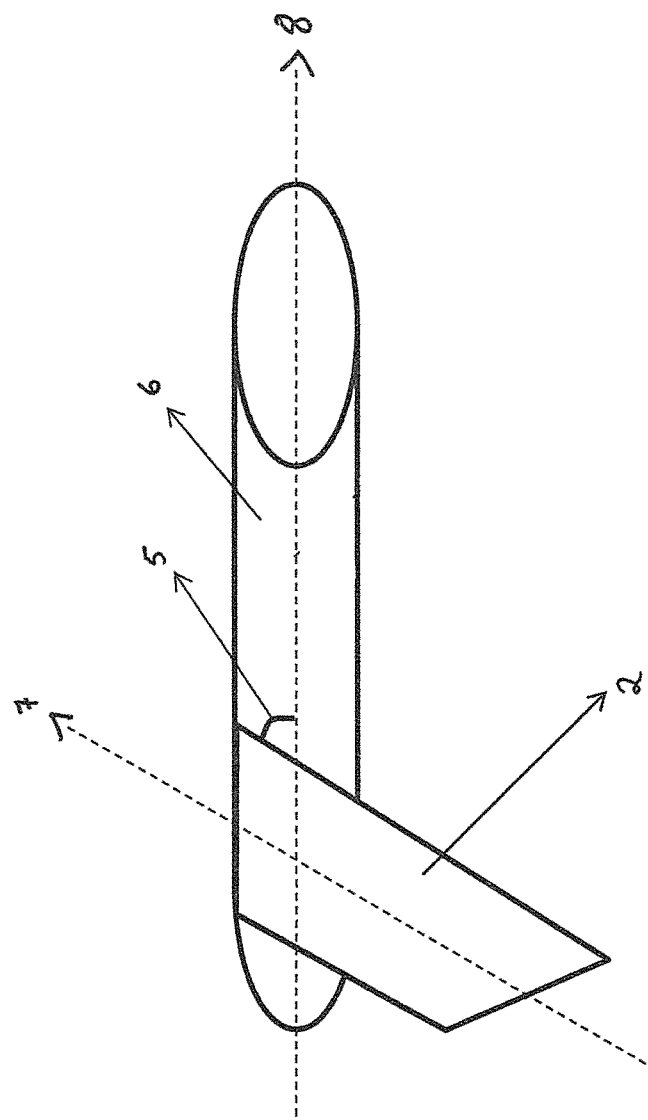
FIG. 1 shows schematically a mandrel for creating a pipe-like hollow article, whereby a tape is wound around the mandrel.

A pipe-like hollow article according to one embodiment is an article in which length dimension is greater than the dimension of width. A pipe-like hollow article, for example, is a pipe or a vessel, whereby the vessel has a height dimension which is greater than width dimension. Preferably the pipe-like article is a pipe, whereby a pipe should be understood as an article, which has two openings approximately perpendicular to the main extension direction of the pipe.

The UHMWPE used in embodiments can be a homopolymer of ethylene or a copolymer of ethylene with a co-monomer that is another alpha-olefin or a cyclic olefin, both with generally between 3 and 20 carbon atoms. Examples include propene, 1-butene, 1-pentene, 1-hexene, 1-heptene, 1-octene, cyclohexene, etc. The use of dienes with up to 20 carbon atoms is also possible, e.g., butadiene or 1-4 hexadiene. The amount of (non-ethylene) alpha-olefin in the ethylene homopolymer or copolymer preferably is at most 10 mol %, preferably at most 5 mol %, more preferably at most 1 mol %. If a (non-ethylene) alpha-olefin is used, it is generally present in an amount of at least 0.001 mol %, in particular at least 0.01 mol %, still more in particular at least 0.1 mol %.

The used UHMWPE tapes have a weight average molecular weight of at least 500 000 gram/mol, in particular between $1.10^6$ gram/mol and $1.10^8$ gram/mol. The weight average molecular weight is determined in accordance with ASTM D 6474-99 at a temperature of 160° C. using 1,2,4-trichlorobenzene (TCB) as solvent. Appropriate chromatographic equipment (PL-GPC220 from Polymer Laboratories) including a high temperature sample preparation device (PL-SP260) may be used. For determination of the average molecular weight greater than two million g/mol rheological methods described in Talebi et al (Macromolecules 2010, 43, 2780-2788; DOI: 10.1021/ma902297b) can also be used. In this method, oscillatory shear measurements and stress relaxation in the linear viscoelastic (LVE) regime are performed using a Rheometrics RMS 800 strain controlled spectrometer over a broad range of temperatures (140-220° C.), angular frequencies (0.001 to 100 rad/s) and strains (0.5 to 2%). By performing strain sweeps, the LVE region is established. Due to high sample stiffness, parallel plate geometry is used with a disk diameter of 8 mm. Sample thickness is 1 mm. For the high molar mass materials, stress relaxation experiments are performed to expand the time window of the measurements. Prior to the measurements, the polymer powders are first compressed at 50° C. and 200 bars, and the thus obtained disks of 8 mm diameter from the sintered powder are heated fast (~30° C./min) to well above the equilibrium melting temperature in the rheometer. Stress relaxation and frequency sweep experiments are performed by applying strain amplitude in the LVE regime.

The tensile strength of the UHMWPE tapes (also referred as tapes) is determined in accordance with ASTM D882-00. Depending on the stretching ratio and stretching temperature, tensile strengths may be obtained of at least 1.5 GPa, or at least 1.7 GPa. In some embodiments, materials may be obtained with a tensile strength of at least 2.0 GPa. Sometimes, a tensile strength of at least 2.5 GPa may be obtained, in particular at least 3.0 GPa, more in particular at least 3.5 GPa. Tensile strengths of at least 4 GPa may also be obtained.

Preferably, the tapes have a high tensile energy to break. The tensile energy to break is determined in accordance with ASTM D882-00 using a strain rate of 50%/min. It is calculated by integrating the energy per unit mass under the stress-strain curve. Depending on the stretching ratio, tapes may be obtained that have a tensile energy to break of at least 15 J/g, or a tensile energy to break of at least 25 J/g. In some embodiments, a material may be obtained with a tensile energy to break of at least 30 J/g, in particular at least 40 J/g GPa, more in particular at least 50 J/g GPa.

The modulus of the UHMWPE tapes is at least 100 GPa. The modulus is determined in accordance with ASTM D882-00. It is possible to obtain moduli of at least 140 GPa, or at least 150 GPa for the tapes.

The tape used as starting material in the present embodiment has a 200/110 uniplanar orientation parameter $\phi$ of at least 3. The 200/110 uniplanar orientation parameter $\phi$ is defined as the ratio between the 200 and the 110 peak areas in the X-ray diffraction (XRD) pattern of the tape sample as determined in reflection geometry. Wide angle X-ray scattering (WAXS) is a technique that provides information on the crystalline structure of matter. The technique specifically refers to the analysis of Bragg peaks scattered at wide angles. Bragg peaks result from long-range structural order. A WAXS measurement produces a diffraction pattern, i.e., intensity, as function of the diffraction angle $2\theta$ (this is the angle between the diffracted beam and the primary beam).

The 200/110 uniplanar orientation parameter gives information about the extent of orientation of the 200 and 110 crystal planes with respect to the tape surface. For a tape sample with a high 200/110 uniplanar orientation, the 200 crystal planes are highly oriented parallel to the tape surface. The ratio between the 200 and 110 peak areas for a specimen with randomly oriented crystallites is around 0.4. The value for the 200/110 uniplanar orientation parameter may be determined using an X-ray diffractometer. A Bruker-AXS D8 diffractometer equipped with focusing multilayer X-ray optics (Gobel mirror) producing Cu-K$\alpha$ radiation (K wavelength=1.5418 Å) is suitable. Measuring conditions: 2 mm anti-scatter slit, 0.2 mm detector slit and generator setting 40 kV, 35 mA. The tape specimen is mounted on a sample holder, e.g., with some double-sided mounting tape. The preferred dimensions of the tape sample are 15 mm×15 mm (l×w). Care should be taken that the sample is kept perfectly flat and aligned to the sample holder. The sample holder with the tape specimen is subsequently placed into the D8 diffractometer in reflection geometry (with the normal of the tape perpendicular to the goniometer and perpendicular to the sample holder). The scan range for the diffraction pattern is from 5° to 40° ($2\theta$) with a step size of 0.02° ($2\theta$) and a counting time of 2 seconds per step. During the measurement, the sample holder spins with 15 revolutions per minute around the normal of the tape, so that no further sample alignment is necessary. Subsequently the intensity is measured as function of the diffraction angle $2\theta$. The peak area of the 200 and 110 reflections is determined using standard profile fitting software, e.g. Topas from Bruker-AXS. As the 200 and 110 reflections are single peaks, the fitting process is straightforward and it is within the scope of the skilled person to select and carry out an appropriate fitting procedure. The 200/110 uniplanar orientation parameter is defined as the ratio between the 200 and 110 peak areas. This parameter is a quantitative measure of the 200/110 uniplanar orientation.

Preferably the tapes are produced according to the process described in EP2307180.

Half of the tapes of the hollow article, and most preferred, more than half of the tapes, are arranged in an angle of 20° to 100°, more preferred in an angle of 30° to 95°, and most preferred in an angle of 45° to 90°, regarding the main extension direction of the pipe-like hollow article (also referred to as the hollow article). In a most preferred embodiment, all tapes of the hollow article are arranged in an angle of 20° to 100°, more preferred in an angle of 30° to 95°, and most preferred in an angle of 45° to 90° regarding the main extension direction of the article to create the hollow article. To create the hollow article, preferably at least one tape is wound under said angle around a mandrel (and thus the tape is arranged in the article as claimed). At least half of the tapes of ultra-high molecular weight polyethylene are arranged in an angle of 20° to 100° in the article, whereby the 200/110 uniplanar orientation of these tapes is parallel to the main extension direction of these tapes, and the main extension direction of these overlapping tapes in the article differ from each other. Due to this special arrangement of the tapes in these mentioned angles, the crystalline orientation in the tape is adjusted within the hollow article, and thus the article is able to compensate for high pressure, especially burst pressure.

Due to the use of special kind of tapes and the special arrangement of the tapes in the hollow article, the hollow article has a great resistance against pressure. Preferably, the hollow article withstands a burst pressure of more than 400 bar for at least 70 seconds, measured according to ASTM D1599-99. Due to the high burst pressure resistance, the hollow article is useful for a great variation of applications, whereby the hollow article is at the same time extra light. However, the manufacturing process for the hollow article is easy and no special apparatus is needed.

Preferably, the main extension direction of at least two overlapping tapes, more preferred of at least half of the overlapping tapes, and most preferred of more than half of overlapping tapes, are in an angle of 0° to 130°, or preferred in an angle of 45° to 130°, more preferred in an angle of 90° to 120°, and most preferred in an angle of 106° to 110°, to each other. Due to this arrangement of overlapping tapes, the pressure resistance increases even more.

Preferably, the tapes for creating the hollow article have a width of more than 10 mm and a thickness of less than 0.5 mm. The 200/110 uniplanar orientation is perpendicular to the width of the tapes, and thus parallel to the main extension direction of the tapes. Due to the use of thin tapes, the tapes can easily be wound around a member to create the hollow article. Thus, also curves or winding articles are obtainable. The number of tapes for the hollow article in one area can be reduced by choosing a tape with a width of more than 10 mm. Thus, the manufacturing process saves time.

In a preferred embodiment, the hollow article is made by a sheet of tapes. The sheet of tapes is preferably wound to create the hollow article. In one embodiment, two sheets, more preferred, four sheets of tapes, are stacked together before they are wound to create the hollow article. Two or four sheets stacked together are mentioned as a stack (of sheets).

Preferably, the tapes are arranged unidirectional in the sheet (of tapes). Unidirectional means that the tapes are oriented parallel to each other within the sheet. In another preferred embodiment, the sheet is a woven sheet made of tapes in warp and weft direction. All common weaving patterns are possible, for example plain weave, twill weave or satin weave.

If a stack is used, preferably at least one sheet, more preferred all sheets, of the stack exhibit tapes in unidirectional arrangement and/or in a woven form.

If sheets have a unidirectional arrangement, preferably at least two sheets are cross plied to each other or arranged in a brick layer arrangement within the stack. In a brick layer arrangement, the direction of tapes is the same in every sheet and the tapes of each sheet are offset to the tapes of adjoining sheets above or below that sheet, whereby the tapes in each sheet are oriented in a unidirectional way (this means parallel side-by-side). Preferably, the tapes have no interspace between each other in one sheet. If there is an interspace, the tapes are arranged in spaced-apart, parallel side-by-side relationship in a first sheet, the interspace between the tapes in the first sheet is preferably smaller than the width of the tapes, after which tapes are arranged in spaced-apart, parallel side-by-side relationship in a second sheet, in which position the interspace in the first sheet are covered up by the tapes in the second sheet. Useful bricklayer arrangements are disclosed in EP 1 868 808 and WO 2008/040506.

Preferably, the thermoplastic and/or thermoplastic elastomer is present on and/or between the tapes in film form. If tapes itself are used for creating the hollow article (no sheet of tapes is used), the film is preferably present on one surface of the tape or on both surfaces of the tape. The tape may comprise on one surface a thermoplastic, and on the other surface, a thermoplastic elastomer film. In another embodiment, the hollow article is created by winding a sheet of tapes. Also, here the sheet maybe covered by a film of thermoplastic and/or thermoplastic elastomer, whereby each surface of the sheet maybe covered with a thermoplastic and/or a thermoplastic elastomer film. If a stack of sheets is used, thermoplastic and/or thermoplastic elastomer film may be arranged on the outer surface of the stack and/or between the sheets (of tapes) in the stack. A film is a thin sheet of material, which can cover the tape or sheet of tapes entirely or partially. In a preferred embodiment, the tape(s) or the sheet(s) made of tapes is covered entirely by the film (this means more than 80% of the tape surface or the sheet surface is covered by the film).

Even if at least one tape or sheet made of tapes is covered by the thermoplastic and/or thermoplastic elastomer, no impregnation of the tape or sheet with thermoplastic and/or thermoplastic elastomer occurs. The difference between coating or covering and impregnating is that in the coating or covering process, only the surface of the tape or sheet is coated with this material. In an impregnating step the coating material is on the surface and also within the tapes or sheets.

The thermoplastic and/or thermoplastic elastomer has a melting point below the melting point of the UHMWPE tapes (for example 145° C.). Low density polyethylene is one useful example.

The hollow article is preferably a pipe or a vessel. Due to the chemical resistance of the UHMWPE tapes, such a vessel or pipe may be useful for transporting water, gas or chemicals. Nevertheless, also other shaped articles can be formed from the tapes, e.g., fishing rods, parts for concrete reinforcement or containers for transportation of shale gas.

A further aspect of this disclosure is a method for making a pipe-like hollow article as described in the paragraphs above. In this process, at least one sheet of ultra-high molecular weight polyethylene (UHMWPE) tapes, coated with a thermoplastic and/or thermoplastic elastomer, is wound on a mandrel to create said article, whereby the mandrel with at least one sheet of tapes and thermoplastic and/or thermoplastic elastomer is heated to melt the thermoplastic and/or thermoplastic elastomer, whereby the temperature stays below 150° C., preferably below 135° C. In the method for making the pipe-like hollow article, the at least one sheet of ultra-high molecular weight polyethylene tapes is wound on the mandrel to create the pipe-like hollow article in such a manner that the ultra-high molecular weight polyethylene tapes have an angle of 20 to 100° with regard to the main extension direction of the article.

Preferably, the at least one sheet of ultra-high molecular weight polyethylene tapes, more preferably at least half of the sheets of ultra-high molecular weight polyethylene tapes, is/are wound on the mandrel in an angle of 20 to 100°, whereby the 200/110 uniplanar orientation of these ultra-high molecular weight polyethylene tapes is parallel to the main extension direction of the tapes.

Preferably, more than one sheet of tapes for creating the pipe-like hollow article is used. Preferably, the sheets are arranged in a cross plied arrangement and/or in a brick layer arrangement, whereby a film of thermoplastic and/or thermoplastic elastomer is arranged in-between, on top and/or on the bottom of the sheets (of tapes).

Yet another aspect of the disclosure is a process for making the pipe-like hollow article made of ultra-high molecular weight polyethylene tapes, in which the ultra-high molecular weight polyethylene (UHMWPE) tapes are wound around a mandrel, whereby the tapes are coated with a thermoplastic and/or thermoplastic elastomer and wherein the mandrel with the tapes are heated to melt the thermoplastic and/or thermoplastic elastomer, whereby the temperature is below 150° C., preferably below 135° C., whereby at least half of the tapes are wound on the mandrel in an angle of 20° to 100° with regard to the main extension direction of the mandrel.

Preferably the 200/110 uniplanar orientation of these ultra-high molecular weight polyethylene tapes (arranged in an angle of 20° to 100° with regard to the main extension direction of the mandrel) is parallel to the main extension direction of the tapes.

Preferably, in both processes (article made by tapes and article made by sheets), approximately half of the tapes, more preferred more than half of tapes, and most preferred almost all tapes, are wound on the mandrel in an angle of 20° to 100°, more preferred in an angle of 30° to 95°, and most preferred in an angle of 45° to 90° regarding the main extension direction of the mandrel to create the hollow article.

For both processes (article made by tapes and article made by sheets), no process step is carried out at a temperature higher than 150° C. This means all process steps in both processes are carried out below 150° C., preferably below 135° C. Temperatures higher than 150° C. destroy the crystalline structure of the tapes and thus the tapes will lose their high tensile strength and modulus. Thus, also the burst pressure of the finished product decreases dramatically, and is not comparable with the burst pressure of an article made by tapes described herein and verified as described.

In both processes, the applied tapes have a tensile strength of greater than 1.5 GPa according to ASTM D882-00 and a modulus of greater than 100 GPa according to ASTM D882-00 and a 200/110 uniplanar orientation parameter of at least 3.

Preferably, the tapes in both processes are wound to create the article in such a manner that the main extension direction of at least half of overlapping tapes in the article differ from each other.

If a stack made of sheets (made of tapes) is used, at least two sheets are treated with a thermoplastic and/or thermoplastic elastomer film under a temperature of 135° C. and 35 bar. The obtained composition is wound or rolled up around a mandrel or any other shaped template to create the desired hollow article. Subsequently, the article is subjected to heat and pressure to obtain the final hollow article.

For creating the hollow article, preferably a sheet of tapes is wound several times around the mandrel. The mandrel is preferably inflatable and heatable. The mandrel and wound up composition are placed in a mold. The mold is heated. By inflating the mandrel, a preliminary pipe-like article is subjected to pressure. Under increased temperature (below 150° C.) and pressure, the final article is shaped. If desired, a smooth inner surface of the hollow article can be obtained by either introducing a different material into (a part of) the tape layer (sheet) adjacent to the mandrel (e.g., nylon, a metal foil), or by melting the tapes of the inner layer.

Preferably, the hollow article can be reinforced by reinforcing fibers, like aramid (preferably poly p-phenylene terephthalamide (PPTA)) or carbon fibers. In one preferred embodiment, the hollow article made of tapes or sheet of tapes is coated with a matrix. The matrix is preferably arranged on the outside surface of the hollow article. The matrix is preferably made of low modulus polyethylene having 200/110 uniplanar orientation parameter below 3, more preferred below 2 and most preferred below 1. Due to the matrix, the hollow article becomes more flexible, whereby high burst pressure resistance remains. In one embodiment, the matrix is applied on the hollow article in a liquid form.

All embodiments regarding the tape orientation in the sheets as described for the hollow article are also applicable in the process for creating the hollow article. In addition, all product features mentioned in the process for making the hollow article are also applicable for the hollow article itself.

The embodiments may be best understood by reference to the Example, whereby the disclosure is not limited by the Example.

Example 1

A hollow pipe is made having an outer diameter of 24 mm and a wall thickness of 1.8 mm. The hollow pipe is made from sheets of tapes. Each tape is made of UHMWPE and has a tensile strength of 2.4 GPa, a thickness of 50 µm and a width of 133 mm. The tapes in one sheet are arranged unidirectionally and the main extension direction of the tapes in adjacent sheets alternates by about 90°.

The tapes are made by the following process:

A polyolefinic powder with a bulk density of 453 g/l was compacted on an isobaric press at 120 bar pressure. The density after compacting was determined by measuring weight and volume of the compacted sheet of the powder. The compression was performed below 142° C., preferably in the region of 135 to 138° C. The compressed sheet of the powder was rolled and stretched in two steps at temperatures in the proximity (error bar 2° C.) of 142° C. and 152° C. respectively.

A stack made of sheets has the following structure:
Stack:
On Top of Each Other:
Adhesive film layer, having a thickness of 10 µm (a low density polyethylene polymer clingy film, i.e., a thermoplastic, used for wrapping or covering food purchased from super market).

In the first sheet of tapes, the main extension direction of the tapes is in a 0° orientation.

In the second sheet of tapes, the main extension direction of the tapes is 90° in respect to the tapes arranged in the first sheet.

An adhesive film layer, having a thickness of 10 µm.

The adhesive layer between the two sheets of tapes comprises low density polyethylene (LDPE). The stack made from the first and second sheet of tapes was laminated at 130° C. for 600 seconds and 50 bar pressure.

Pipe Made from the Stack:

The stack was wound around a mandrel, whereby the main extension direction of the outer sheet of tapes (first sheet of tapes) is in an angle of approximately 90° to the main extension direction of the mandrel.

The mandrel was made of silicon and was subjected to 50 bar for at least 30 minutes and was heated up to 135° C. Afterwards, mandrel and wound stack was cooled to room temperature and the obtained pipe was drawn from the mandrel.

Since the temperature was never raised above the melting point of the oriented UHMWPE tapes, high orientation of the tapes and the tensile strength as well as tensile modulus were maintained in the pipe. The obtained hollow pipe has a high stiffness resulting in a metallic sound when dropped on ceramic floor. The pipe was subjected to hydraulic pressure according to ASTM D1599-99 at room temperature of 22° C.

The obtained pipe could withstand pressures up to 500 bars for at least 70 seconds, where the pressure of a fluid inside of the pipe was increased from 1 bar to 500 bars in 1 minute, leading to the maximum hoop stress of 3083 bars (for a radial pressure of 500 bars) as calculated from the formula provided in the section 10 of ASTM D1599-99. The measurement takes place at 22° C.

Comparative Example 1

The comparative example shows that the tapes of the pipe according to EP 223252 do not have a tensile strength of greater than 1.5 GPa according to ASTM D882-00 and a modulus of greater than 100 GPa according to ASTM D882-00 and a 200/110 uniplanar orientation parameter of at least 3.

In a first trial, a pipe according to Example 1 was created. The pipe was heated up to 180° C. according to the applied process temperatures in EP 223252. Due to the temperature, the pipe loses the form and no pressure measurement can be made.

In a second trial, a sheet of tapes according to Example 1 was created. This sheet was heated up to 180° C. according to the applied process temperatures in EP 223252. Due to the temperature the tapes in the sheet lose their uniplanar orientation parameter 200/100 from the initial value of 5.98 to 0.51 as FIG. 5 and table 1 show.

TABLE 1

| Sample | I 110 (counts) | I 200 (counts) | Ratio I 200/I 110 |
|---|---|---|---|
| Example 1 | 16034.9 | 95949.2 | 5.98 |
| Comparative Example 1 | 17102.2 | 8806.5 | 0.51 |

As can be seen from table 1, the tapes of the Comparative Example lose their 200/110 uniplanar orientation parameter due to the process temperature of 180° C. Although the tapes of the Example and the Comparative Example were identical as starting material, the processing conditions change the mechanical behaviors of the tapes. Such tapes have a worse tensile strength and modulus, which is not comparable to the tapes according to the Example.

Further Examples

The hollow pipes are made from sheets of tapes. Each tape is made of UHMWPE (ultra-high molecular weight polyethylene) and has a tensile strength of 2.4 GPa, a thickness of 50 μm and a width of 133 mm. The tapes in one sheet are arranged unidirectional.

The tapes are made by the following process:

A polyolefinic powder with a bulk density of 453 g/l was compacted on an isobaric press at 120 bar pressure. The density after compacting was determined by measuring weight and volume of the compacted sheet of the powder. The compression was performed below 142° C., preferably in the region of 135 to 138° C. The compressed sheet of the powder was rolled and stretched in two steps at temperatures in the proximity (error bar 2° C.) of 142° C. and 152° C. respectively.

A stack made of sheets has the following structure:
Stack:
On top of each other:
Adhesive film layer, having a thickness of 10 μm.
First sheet of tapes.
Second sheet of tapes.
Adhesive film layer, having a thickness of 10 μm.
The stack made from the first and second sheet of tapes was laminated at 130° C. for 600 seconds and 50 bar pressure.

Pipe Made From the Stack:
The stack was wound around a mandrel.
The mandrel was made of silicon and was subjected to 50 bar for at least 30 minutes and was heated up to 135° C. Afterwards, mandrel and wound stack were cooled to room temperature and the obtained pipe was drawn from the mandrel.

Since the temperature was never raised above the melting point of the oriented UHMWPE tapes, high orientation of the tapes and the tensile strength as well as the tensile modulus were maintained in the pipe (with the exception of comparative example IV in Table 2). The obtained hollow pipe has a high stiffness resulting in a metallic sound when dropped on ceramic floor. The pipe was subjected to hydraulic pressure according to ASTM D1599-99 at room temperature of 22° C.

The burst pressure was measured according to ASTM D1599-99. A fluid inside the pipe was increased from 1 bar to 500 bars in 1 minute, leading to the maximum hoop stress of 3083 bars (for a radial pressure of 500 bars) as calculated from the formula provided in the section 10 of ASTM D1599-99. The measurement took place at 22° C.

TABLE 2

| Example/ Comparative Example | Winding angle [°] tapes to pipe | Winding angle [°] overlapping tapes | Material adhesive film | Outer diameter [mm] before pressure | Outer diameter [mm] after pressure | Instant burst pressure [bar] | Variation Diameter [%] |
|---|---|---|---|---|---|---|---|
| Example II | +/−45 | 0/90 | HDPE | 24 | 24.3 | 1000 | 1.25 |
| Example III | +/−45 | 0/90 | HDPE | 24 | 24.3 | 1000 | 1.25 |
| Comp. II | 90 | 0 | HDPE | 24 | — | 13 | — |
| Comp. III | 45 | 0 | HDPE | 24 | — | 17 | — |
| Comp. IV | +/−45 | 0/90 | HDPE | 24 | — | 15 | — |

In Example II and Example III, the tapes are unidirectionally arranged in layers (sheets), whereby each layer is wound around the mandrel to create the pipe in an angle of 45°. The 200/110 uniplanar orientation of the tapes is parallel to the main extension direction of the tapes, and thus also the 200/110 uniplanar orientation of the tapes is in a 45° angle to the main extension direction of the obtained pipe. Overlapping tapes (in different tape layers) have an angle of 90° to each other, this means the tape layers are crossplied (see FIG. 2). The obtained pipes are made by four cross plied layers of tapes in both examples and withstand a burst pressure of 1000 bar without a significant variation in the outer diameter. This means the obtained pipe according to examples II and III is characterized by high dimension stability. In comparative to the examples II, III and IV (Comp. II, Comp. III and Comp IV), the same kind of tapes are used as for the examples II and III. The tapes are also unidirectionally arranged within a layer, whereby also here the 200/110 uniplanar orientation of the tapes is parallel to the main extension direction of the tapes. In comparative example II, all four tape layers are wound around the mandrel in an angle of 90°. This means all tapes within the obtained pipe have an angle of 90° to the main extension direction of the pipe. Overlapping tapes within the pipe have no angle between each other. Such a pipe breaks by applying a burst pressure of 13 bar. No outer diameter can be measured after applying the burst pressure. In comparative example III, all tapes (arranged in four tape layers) are wound on the mandrel at an angle of 45° to the main extension direction of the mandrel (thus the main extension direction of the tapes are in an angle of 45° to the main extension direction of the obtained pipe). Overlapping tapes within the obtained pipe have no angle between each other. Also, in this comparative example, the obtained pipe burst by applying a burst pressure of 17 bar. No outer diameter after applying the burst pressure can be measured. In comparative example IV, a pipe was made in the same manner as described for example II and III, with the exception that the pipe was heated up to a temperature of approximately 180°. After the pipe cooled down a burst pressure was applied to the pipe. The pipe burst by applying a burst pressure of 15 bar. No further measurements were made. Due to the heat treatment of the pipe, the 200/110 uniplanar orientation of the tapes within the pipe disappears, and thus the burst pressure stability. Comparative example IV shows therefore, that also a pipe made of unorientated UHMWPE tapes will not withstand a high burst pressure.

The embodiments may best be understood by reference to the following drawings 1 to 5. The figures are examples intended to describe preferred embodiments and should not be construed in any manner as limiting the scope of the disclosure as set forth in the accompanying claims.

In FIG. 1, a mandrel 6 with a main extension direction 8 is shown. Around this mandrel 6, a tape 2 made of ultra-high molecular weight polyethylene (UHMWPE) is wound. The tape 2 has a main extension direction 7 and the winding around the mandrel 6 is carried out such that the main extension direction 7 of the tape 2 is in an angle 5 of 20 to 60°, preferably approximately 53°, with regard to the main extension direction 8 of the mandrel 6. It should be clear that the main extension direction 8 of the mandrel 6 is equivalent to the main extension direction of the obtained article 1 (not shown in FIG. 1).

Figure 2:
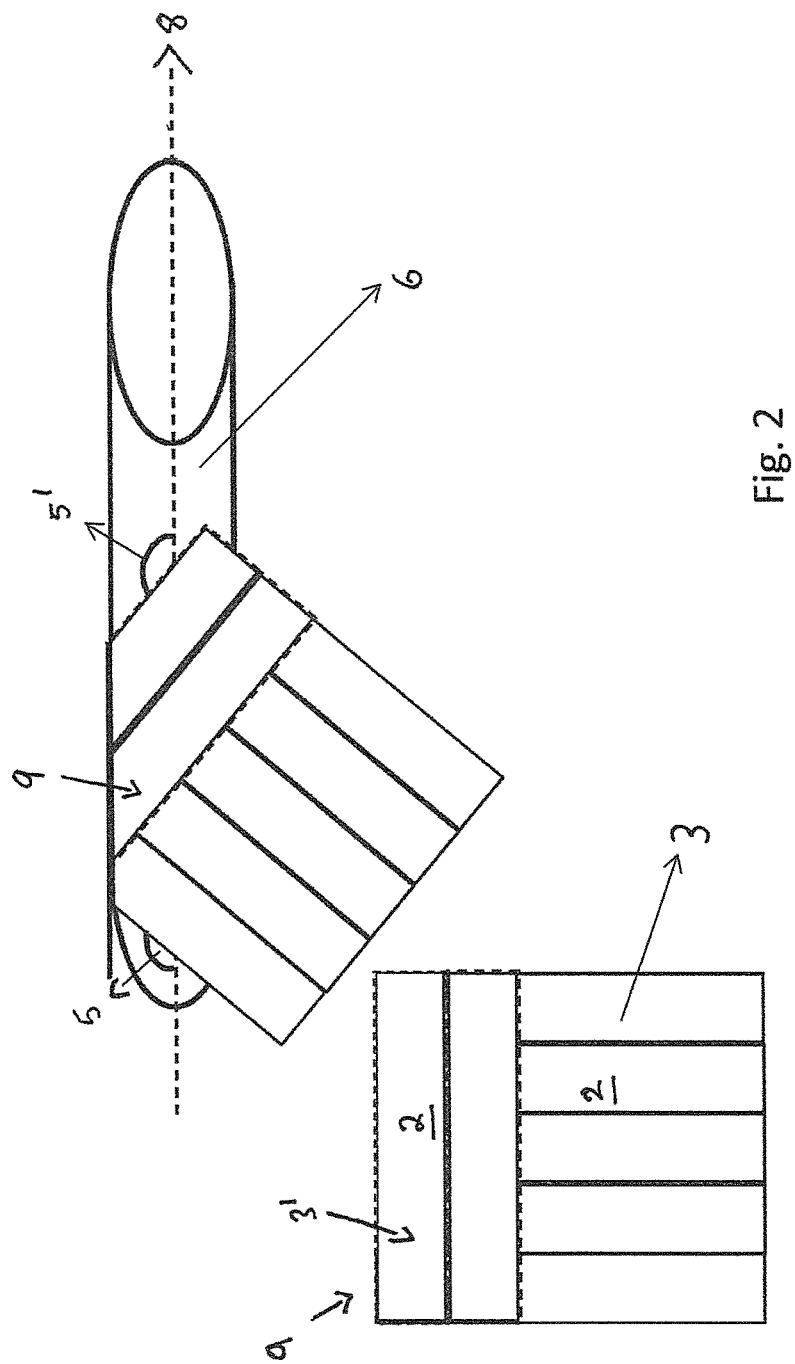
FIG. 2 shows schematically a mandrel for creating a pipe-like hollow article, whereby a sheet of tapes is wound around the mandrel.

FIG. 2 shows a stack 9 made of sheets 3, 3' made of tapes 2. The stack 9 comprises (in this embodiment) two sheets 3, 3'. A first sheet 3 comprises tapes 2 in unidirectional arrangement (vertical) and a second sheet 3' (only indicated with two tapes 2) is cross plied to this first sheet 3. This means the tapes 2 of the first sheet 3 are in an angle (preferably 90°) to the tapes 2 of the second sheet 3'. On both surfaces of the stack 9 a film 4 (not shown in FIG. 2) or foil of thermoplastic and/or thermoplastic elastomer is coated. Also, between the first sheet 3 and the second sheet 3', such a film 4 is arranged. The stack 9 is wound around the mandrel 6, whereby the main extension direction of the tapes 2 is in an angle 5, 5' of approximately 53° and 37° with regard to the main extension direction 8 of the mandrel 6. In one other example, the stack 9 is wound around the mandrel 6 in such a way that the tapes 2 of the second sheet 3' have an angle of 90° to the main extension direction 8 of the mandrel 6.

Figure 3:
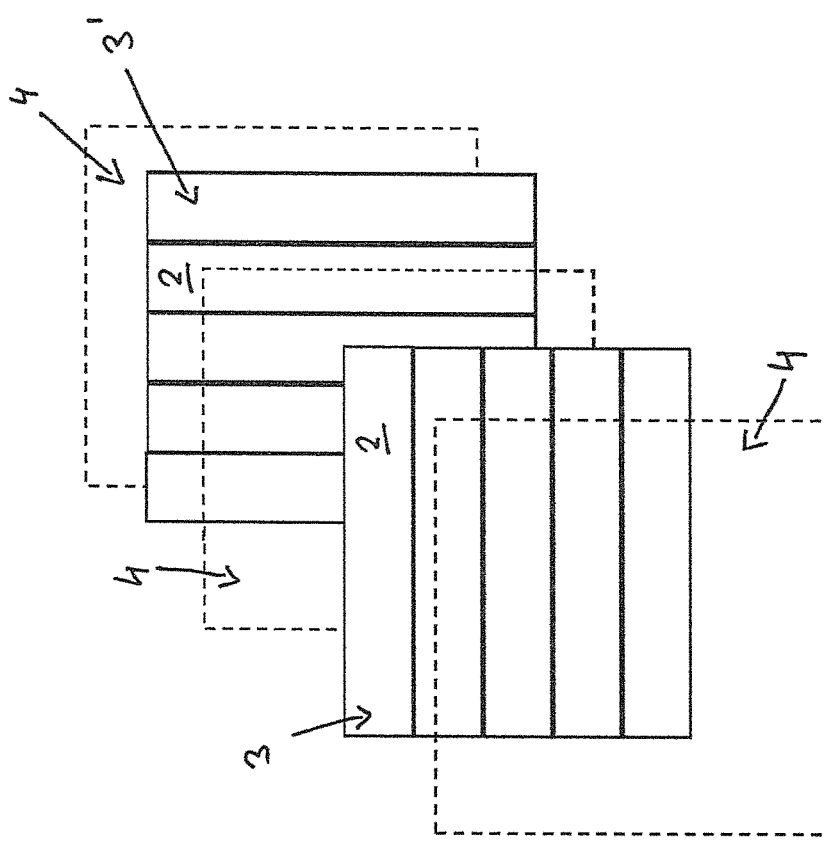
FIG. 3 shows a sheet of tapes with thermoplastic film.

In FIG. 3, a stack 9 is shown in an exploded view. In this example, the stack 9 comprises a first sheet 3 and a second sheet 3'. The tapes 2 of the first sheet 3 are arranged in an angle of approximately 90° to the tapes 2 of the second sheet 3'. Also, other angles between the tapes 2 of the first and second sheet 3, 3' are possible, for example: 45°. On top and at the bottom of the stack 9, a film 4 or foil of thermoplastic or thermoplastic elastomer is provided. Also, between the first sheet 3 and the second sheet 3', a film 4 or foil is arranged. If the stack 9 is built up by woven sheets or a combination of woven and unidirectional sheets, the film 4 or foil may be arranged at the same positions.

Figure 4:
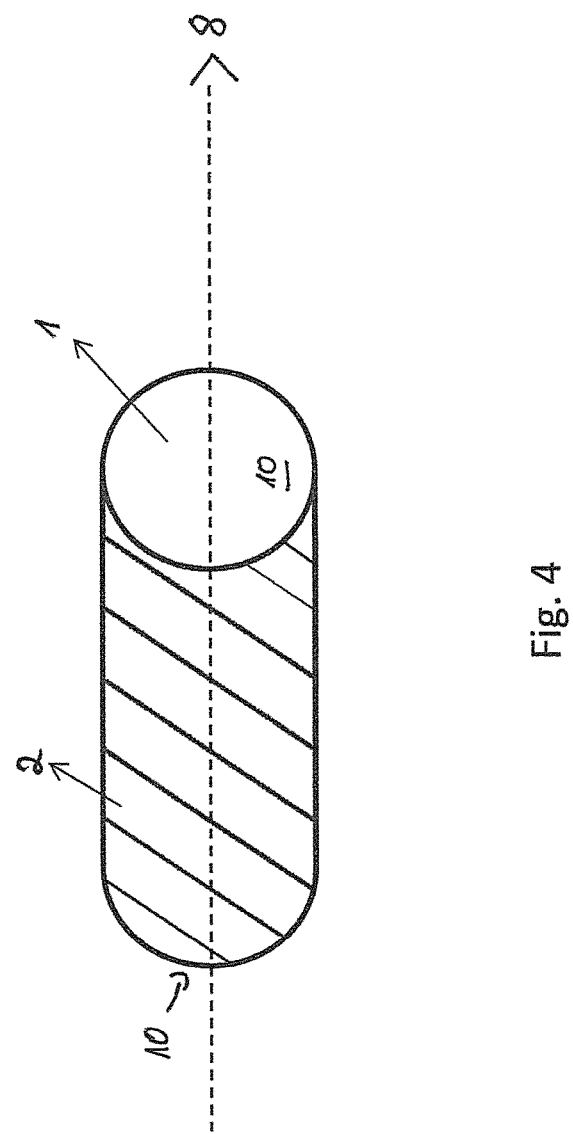
FIG. 4 shows an article made of tapes.

FIG. 4 shows a pipe-like hollow article 1, whereby in this example, a pipe 1 (with two openings 10) is mapped. The pipe 1 is built up by tapes 2, whereby the tapes 2 are arranged in the pipe 2 such that the main extension direction of the tapes 2 in the pipe 1 is in an angle of approximately 50° with regard to the main extension direction 8 of the pipe 1. It is also possible that the tapes 2 have an angle of approximately 90° in respect to the main extension direction 8 of the pipe 1.

Figure 5:
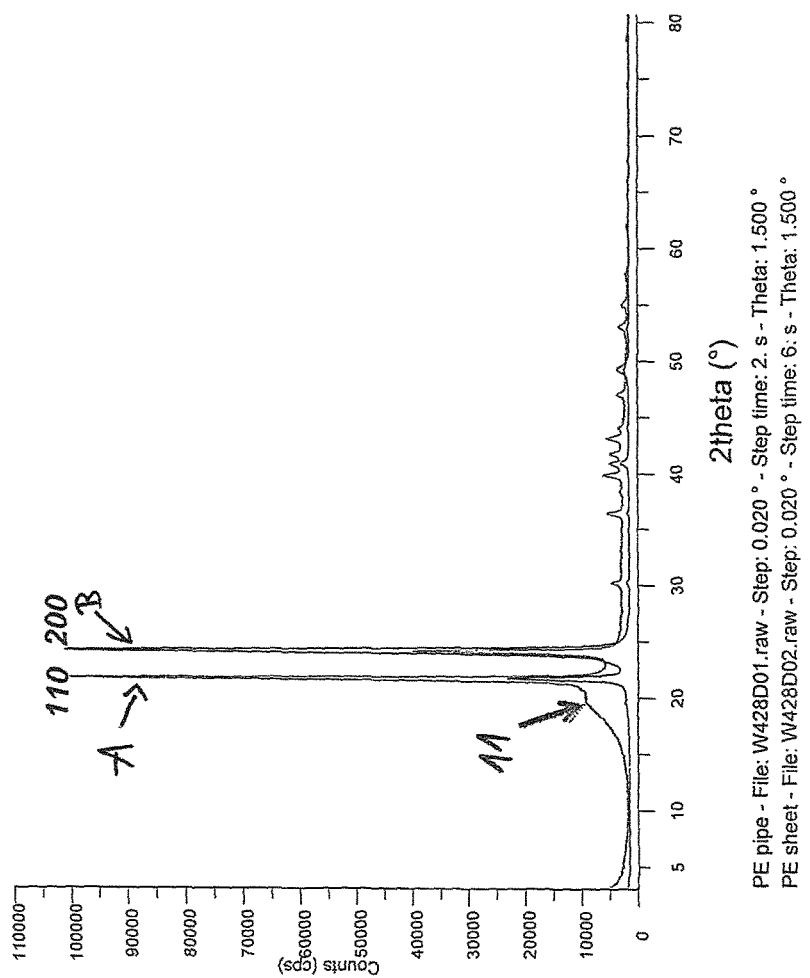
FIG. 5 shows an x-ray diffraction result of a sheet according to a comparative example and a pipe according the Example.

FIG. 5 shows an x-ray diffraction (XRD) of a pipe 1 according to the Example and a sheet 3 according to the Comparative Example. The sheet 3 as a sample has a considerable amorphous contribution shown in curve A and is much closer to a random texture than the pipe 1 according to the Example, which shows a strong uniplanar orientation parameter in curve B. The arrow 11 characterizes a more amorphous distribution in curve A. Curve A multiplied by 10.3 refers to pipe 1 treated at process temperatures of 180° C.

LIST OF REFERENCE NUMBERS

1 pipe-like hollow article (pipe)
2 tape
3 first sheet of tapes
3' second sheet of tapes
4 film
5 angle
5' angle
6 mandrel
7 main extension direction of the tape
8 main extension direction of the mandrel/pipe-like hollow article
9 stack (made of sheets 3, 3')
10 openings
11 arrow
A curve
B curve

The invention claimed is:

1. A pipe-like hollow article comprising
ultra-high molecular weight polyethylene (UHMWPE) tapes; and
a thermoplastic and/or thermoplastic elastomer, wherein
the tapes have a tensile strength of greater than 1.5 GPa according to ASTM D882-00,
a modulus of at least 100 GPa according to ASTM D882-00,
a 200/110 uniplanar orientation parameter of at least 3,
a main extension direction of at least half of the tapes in the article is in an angle of 20 to 100° with regard to a main extension direction of the article,
the at least half of the tapes have a 200/110 uniplanar orientation parallel to the main extension direction of the tapes that are in an angle of 20 to 100° with regard to the main extension direction of the article,
a main extension direction of at least half of overlapping tapes in the article differ from each other, and
the article is formed of wound tapes.

2. The pipe-like hollow article according to claim 1, wherein a main extension direction of at least two overlapping tapes is at an angle of 45° to 130° to each other.

3. The pipe-like hollow article according to claim 1, wherein the article withstands a burst pressure of more than 400 bar for at least 70 seconds, measured according to ASTM D1599-99.

4. The pipe-like hollow article according to claim 1, wherein the tapes have a width of more than 10 mm and a thickness of less than 0.5 mm.

5. The pipe-like hollow article according to claim 1, whereby the thermoplastic and/or thermoplastic elastomer is present on and/or between the tapes in form of a film.

6. The pipe-like hollow article according to claim 1, wherein the article comprises at least one sheet of tapes.

7. The pipe-like hollow article according to claim 6, wherein the at least one sheet of tapes is covered by at least one thermoplastic and/or thermoplastic elastomer film.

8. The pipe-like hollow article according to claim 6, wherein the article comprises at least two sheets of tapes, wherein a thermoplastic and/or thermoplastic elastomer film is between the sheets of tapes.

9. The pipe-like hollow article according to claim 8, wherein the at least two sheets of tapes are cross plied to each other or the at least two sheets are in a brick layer arrangement.

10. The pipe-like hollow article according to claim 6, wherein the at least one sheet of tapes is a unidirectional sheet of tapes, or the tapes are woven to form the sheet.

11. The pipe-like hollow article according to claim 1, wherein the hollow article is a pipe or a vessel.

12. The pipe-like hollow article according to claim 1, wherein the ultra-high molecular weight polyethylene tapes have a weight average molecular weight of at least 500,000 gram/mol.

13. A process for making a pipe-like hollow article comprising:
   winding at least one sheet of ultra-high molecular weight polyethylene tapes coated with a thermoplastic and/or thermoplastic elastomer on a mandrel to create the article,
      wherein the winding occurs in such a manner that the ultra-high molecular weight polyethylene tapes have an angle of 20 to 100° with regard to a main extension direction of the article; and
   heating the mandrel with the at least one sheet of tapes and thermoplastic and/or thermoplastic elastomer to melt the thermoplastic and/or thermoplastic elastomer, wherein a temperature of the heating is below 150° C., and
   the tapes have:
      a tensile strength of greater than 1.5 GPa according to ASTM D882-00,
      a modulus of greater than 100 GPa according to ASTM D882-00, and
      a 200/110 uniplanar orientation parameter of at least 3, and/or the tapes are wound to create the article in such a manner that the 200/110 uniplanar orientation of the tapes is parallel to a main extension direction of the tapes.

14. The process according claim 13, wherein more than one sheet of tapes is used in the winding,
   the sheets of tapes are arranged in a cross plied arrangement and/or in a brick layer arrangement, and
   a film of thermoplastic and/or thermoplastic elastomer is arranged in-between, on top and/or on the bottom of the sheets of tapes.

15. The process according to claim 13, wherein the ultra-high molecular weight polyethylene tapes have a weight average molecular weight of at least 500,000 gram/mol.

16. A process for making a pipe-like hollow article comprising:
   winding ultra-high molecular weight polyethylene tapes around a mandrel,
      wherein the ultra-high molecular weight polyethylene tapes are coated with a thermoplastic and/or thermoplastic elastomer, and
      at least half of the tapes of the ultra-high molecular weight polyethylene tapes are wound around the mandrel with a main extension direction in an angle of 20 to 100° with regard to a main extension direction of the mandrel; and
   heating to melt the thermoplastic and/or thermoplastic elastomer,
      wherein a temperature of the heating is below 150° C., and
   the tapes have:
      a tensile strength of greater than 1.5 GPa according to ASTM D882-00,
      a modulus of greater than 100 GPa according to ASTM D882-00, and
      a 200/110 uniplanar orientation parameter of at least 3, and/or the tapes are wound to create the article in such a manner that the 200/110 uniplanar orientation of the tapes is parallel to a main extension direction of the tapes.

17. The process according to claim 16, wherein the ultra-high molecular weight polyethylene tapes have a weight average molecular weight of at least 500,000 gram/mol.

* * * * *